United States Patent Office 3,055,935
Patented Sept. 25, 1962

3,055,935
METHOD FOR PREPARING SALICYLIC ACID
John N. Periard and George W. Waldron, Bay City, Mich., assignors to The Dow Chemical Company, Midland, Mich., a corporation of Michigan
No Drawing. Filed Oct. 2, 1959, Ser. No. 843,935
3 Claims. (Cl. 260—521)

The present invention relates to a new and useful method for preparing salicylic acid and more particularly relates to a new and improved method for the continuous precipitation of dense, large free-flowing salicylic acid crystals.

Various methods have been proposed for the preparation of the free salicylic acid from its sodium salt. These methods generally require heating of an aqueous solution of the sodium salicylate and, while hot, adding an excess of sulfuric or hydrochloric acid and then cooling the resulting mixture to precipitate long needle-shaped crystals. The resulting crystals are recovered by filtration and then centrifuged, dryed and sublimed. The mother liquor from the filtration is cooled, resulting in additional precipitation, and the crystals recovered in the above manner by filtering or centrifuging, or the like. It usually requires at least 2 cooling steps of the mother liquors to accomplish even a nearly complete recovery of the salicylic acid. The crops of crystals recovered from the mother liquor are not of a grade suitable for sale and therefore must be recycled to the earlier steps to obtain desirable salable crystals. The equipment necessary to accomplish these repeated crystalizations commercially is necessarily large and expensive. The time consumed is naturally great. Finally the product obtained even from the first recovery is normally of a density of only about 23 lbs. per cubic foot. It therefore would be desirable to obtain a continuous, single-step precipitation process resulting in high density crystals of a large size easily filtered and dried.

It is an object of the present invention to provide a single-step, continuous precipitation technique to produce large easily filterable, dense, free-flowing salicylic acid crystals. These and other objects will become apparent to those skilled in the art.

The present invention comprises the steps of continuously introducing aqueous alkali metal salicylate solution, such as, for example, sodium salicylate, and sulfuric acid into a suitable reactor such as a cylindrical vertically baffled crystallization tank provided with an agitator near the bottom thereof; maintaining a pH of the solution of between about 1.8 and about 2.5; maintaining the temperature of the crystallization zone between about 50° and about 80° C.; and, withdrawing from said crystallization zone crystals having an average particle size of from 100 to about 1000 microns in width and from 1000 to about 3000 microns in length. The crystallization proceeds readily when the residence time of the reactants in the crystallizer is between about 1 and about 4 hours. The agitation is moderate to vigorous and much more turbulent than that agitation usually associated with the growth of large crystals. The agitation can be produced for example by employing a paddle wheel turbine, or any other similar suitable means. The aqueous sodium salicylate solution is preferably introduced as a solution having a concentration of from between about 50 to about 150 grams of salicylate per liter of solution. The sulfuric acid is an aqueous solution having a concentration of from between about 20° and about 60° Bé. It is to be understood that, while the description has been limited to sulfuric acid, other acids which form a water-soluble salt with the cation of the salicylate may be employed such as, for example, hydrochloric acid. Likewise, instead of sodium salicylate, other soluble salicylate salts may be used.

The following examples illustrate the method of the present invention but are not to be construed as limiting:

*Examples 1–5*

An 11½ inch diameter cylindrical glass tank having a capacity of about 4 gallons and fitted vertical baffles and a paddle wheel agitator was charged with a mother liquor having a specific gravity of 1.06. The mother liquor had a pH of 1.9–2.1 and contained approximately 6 percent $Na_2SO_4$. The charge was heated to about 65° C. and agitation commenced. The feed solutions containing aqueous 12 percent sodium sodium salicylate and 40° Bé. sulfuric acid were each simultaneously introduced through glass tubes into the crystallizer tank at the top of the agitator. The rate of addition of feed was adjusted to maintain the slurry at a pH of from 1.9 to 2.1 and to provide a 1 hour retention time. Mother liquor was drawn off through a Monel filter, thus retaining in the crystallizer the precipitated crystals while maintaining the liquid level at a substantially constant inventory of 3.3 gallons. When one volumetric inventory (3.3 gal.) of mother liquor had been withdrawn from the crystallizer the Monel filter was removed and the withdrawal of contents continued. The withdrawn contents now contained crystals as well as mother liquor. The withdrawn contents were cooled to 35° C., aged 30 minutes, filtered to recover the crystals and the crystals washed and dried. The general procedure outlined above was repeated, altering variables while maintaining the others constant. The results of such operations wherein the different variables had been altered are shown in the following table. The data recorded illustrate the effect or crystal size when deviation in different variables is made. It should be noted, however, that in all examples wherein the techniques here described are employed some increase is obtained in either or both crystal size and bulk density over that obtained by conventional techniques.

| Ex. No. | Temperature, °C. | pH | Inventory time, hr. | Agitation, watts/gal. | R.p.m. | Percent $H_2O$ in dewatered cake | Bulk density, lbs. sal. acid per ft.³ Washed cake | Bulk density, lbs. sal. acid per ft.³ Dry solids | Particle size, microns | Dry screen analysis Percent plus 20 mesh | Dry screen analysis Percent minus 35 mesh | Chemical analysis of dry product Percent $SO_4$ | Chemical analysis of dry product Percent sal. acid |
|---|---|---|---|---|---|---|---|---|---|---|---|---|---|
| 1a | (¹) | | | | | 28 | 24.6 | 26.4 | 25–35 x 250–500 | | | | |
| 1b | | | | | | 17 | 23.6 | 26.8 | | | | .04 | 99.6 |
| 2a | 35 | 2 –2.5 | 1.9 | 1.6 | ²600 | 41 | 15.5 | | 10–15 x 150–300 | 0 | 100 | | |
| 2b | 50 | 2 –2.5 | 1.9 | 1.6 | ²600 | 15.6 | 17.9 | 24.6 | 40–60 x 500–1,500 | | | .16 | 99.3 |
| 2c | 50 | 2 –2.5 | 1.9 | 1.6 | ²600 | 21 | 22 | | 30–100 x 500–1,200 | | | .02 | 99.5 |
| 2d | 65 | 2 –2.5 | 1.9 | 1.6 | ²600 | 19 | 28.6 | | 100–250 x 500–2,500, 30–50 x 500–750. | | | .03 | 99.5 |
| 2e | 65 | 1.8–2.1 | 1.2 | 1.3 | ³130 | 10.7 | 33.6 | 37.1 | 150–300 x 750–1,500, 3–30 x 100–300. | 36 | 45 | .04 | 99.5 |
| 2f | 74 | 1.8–2.1 | 1.2 | 1.3 | ³130 | | 25.6 | | 350–1,000 x 1,000–3,500, 5–100 x 50–1,500. | 13.7 | 37.1 | .02 | 99.5 |
| 2g | 65 | 2 –2.3 | 1.2 | 2.4 | ³160 | 13.4 | 35.8 | 43.5 | 500–1,000 x 1,000–3,000, down to 30 x 300. | 35.8 | 45.3 | | |
| | | | | | | | | | | 39.4 | 45.0 | .02 | 99.3 |

| Ex. No. | Temperature, °C. | pH | Inventory time, hr. | Agitation, watts/gal. | R.p.m. | Percent H₂O in dewatered cake | Bulk density, lbs. sal. acid per ft.³ Washed cake | Bulk density, lbs. sal. acid per ft.³ Dry solids | Particle size, microns | Dry screen analysis Percent plus 20 mesh | Dry screen analysis Percent minus 35 mesh | Chemical analysis of dry product Percent SO₄ | Chemical analysis of dry product Percent sal. acid |
|---|---|---|---|---|---|---|---|---|---|---|---|---|---|
| 2h | 74 | 2 -2.3 | 1.2 | 2.4 | ³ 160 | 8 | 33.7 | 38 | 250-400 x 1,000-2,000, 30-100 x 100-500. | | | | |
| 3a | 65 | 1.8-2.1 | 0.35 | 0.3 | ³ 80 | | | | 5-15 x 50-150 | | | .02 | 99.5 |
| 3b | 65 | 1.8-2.1 | 1.2 | 0.3 | ³ 80 | 17.6 | 24 | | 150-450 x 750-3,000, 50-60 x 500 | | | | |
| 3c | 65 | 1.8-2.1 | 1.85 | 0.3 | ³ 80 | 16.2 | 29.5 | | 250-300 x 750-2,000, 40-60 x 500-1,000. | | | .02 | 99.3 |
| 3d | 65 | 2 -2.2 | 1.2 | 2.3-2.4 | ³ 160 | 13.4 | 35.8 | 43.5 | 500-1,000 x 1,000-3,000-down to 30 x 300. | 39.4 | 45.0 | | |
| 3e | 65 | 2 -2.2 | 1.85 | 2.3-2.4 | ³ 160 | 15 | 35.6 | | 400-1,000 x 750-2,500, 20-50 x 150-500. | 46 | 38 | | |
| 4a | 65 | 1.3-1.7 | 1.2 | 1.3 | ³ 130 | | | | few 40-60 x 500-1,000, 3-10 x 50-150. | 13.7 | 37.1 | .02 | 99.5 |
| 4b | 65 | 1.8-2.1 | 1.2 | 1.3 | ³ 130 | 10.7 | 33.6 | 37.1 | 150-300 x 750-1,500, 3-30 x 100-300. | | | .04 | 99.8 |
| 4c | 65 | 1.9-2.1 | 1.9 | 1.6 | ² 600 | 19.2 | 29.1 | | 200-300 x 500-2,500, 10-15 x 50-100. | | | .06 | 99.7 |
| 4d | 65 | 4.0 | 1.9 | 1.6 | ² 600 | 33 | 16.8 | | 60-80 x 600-800, most 8-10 x 100-300. | | | .02 | 99.5 |
| 5a | 65 | 1.8-2.2 | 1.2 | 0.3 | ³ 80 | 17.6 | 24.0 | | 150-450 x 750-3,000, 50-60 x 500 | | | .02 | 99.5 |
| 5b | 65 | 1.8-2.2 | 1.2 | 1.3 | ³ 130 | 10.7 | 33.6 | 37.1 | 150-300 x 750-1,500, 3-30 x 100-300. | 13.7 | 37.1 | | |
| 5c | 65 | 1.8-2.2 | 1.2 | 2.4 | ³ 160 | 13.4 | 35.8 | 43.5 | 500-100 x 1,000-3,000, down to 30 x 300. | 39.4 | 45.0 | .02 | 99.3 |
| 5d | 65 | 1.8-2.2 | 1.2 | 4.75 | ³ 200 | | | | 500-1,000 x 1,000-2,000, down to 5 x 50. | | | | |

¹ Sample of current plant production.  ² Using a 3-inch diameter, 6 bladed turbine.  ³ Using an 8-inch diameter, 2 bladed paddle.

We claim:

1. In a method for producing salicylic acid crystals the steps which comprise continuously feeding an aqueous alkali metal salicylate and an inorganic acid to a crystallization tank while maintaining said tank and contents at between 50° C. and 80° C. vigorously agitating the contents of said tank; maintaining the pH of said contents between about 1.8 and 2.5, and, withdrawing, after a residence time of from 1 to 4 hours under the stated conditions, a portion of the contents, filtering the crystalline salicylic acid free of liquid, washing and drying the crystalline salicylic acid product.

2. The method of claim 1 which comprises maintaining the salicylate sulfuric acid reaction mixture in residence of from 1 to 4 hours.

3. The method of claim 1 wherein the salicylate is sodium salicylate and the inorganic acid is sulfuric acid.

References Cited in the file of this patent

B. H. Wilcoxon: Salicyclic acid, Feb. 28, 1946, pages 1-5.

Office of Military Government for Germany (US), Fiat Final Report No. 744.

Griffiths: J. Soc. Chem. Ind. London, vol. 44, p. 7T (1925).

Weissberger: Technique of Organic Chemistry, vol. III, p. 449 (1950). (Copies in Library.)